US012663273B2

(12) United States Patent (10) Patent No.: US 12,663,273 B2
Kuehner et al. (45) Date of Patent: Jun. 23, 2026

(54) ADJUSTING ARRIVAL TIME BASED ON DESTINATION CONDITIONS

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 122 days.

(21) Appl. No.: 18/096,252

(22) Filed: Jan. 12, 2023

(65) Prior Publication Data

US 2024/0240949 A1 Jul. 18, 2024

(51) Int. Cl.
*G01C 21/34* (2006.01)

(52) U.S. Cl.
CPC ..... *G01C 21/3453* (2013.01); *G01C 21/3407* (2013.01)

(58) Field of Classification Search
CPC ............ G01C 21/3453; G01C 21/3407; G01C 21/3415
USPC ........................................................ 701/400
See application file for complete search history.

(56) References Cited

U.S. PATENT DOCUMENTS

| | | | |
|---|---|---|---|
| 8,700,327 B2 | 4/2014 | Cabral | |
| 9,043,135 B2 | 5/2015 | Dave et al. | |
| 9,558,664 B1 * | 1/2017 | Gaebler | G08G 1/144 |
| 2012/0139755 A1 | 6/2012 | Ginsberg | |
| 2013/0103300 A1 | 4/2013 | Rakthanmanon et al. | |
| 2015/0168169 A1 * | 6/2015 | Caceres | G08G 1/0133 701/400 |
| 2015/0198452 A1 | 7/2015 | Gupta et al. | |
| 2017/0314939 A1 * | 11/2017 | Carter | G01C 21/3492 |
| 2020/0379108 A1 * | 12/2020 | Vijayalingam | G06V 20/58 |
| 2022/0222597 A1 * | 7/2022 | Neese | G06Q 10/06311 |

FOREIGN PATENT DOCUMENTS

JP 2022148997 A 10/2022

* cited by examiner

*Primary Examiner* — Helal A Algahaim
*Assistant Examiner* — John D Holman
(74) *Attorney, Agent, or Firm* — Christopher G. Darrow; Darrow Mustafa PC

(57) ABSTRACT

An estimated time of arrival of a vehicle can be adjusted based on conditions at a destination. An arrival time at a destination can be determined. It can be determined whether a condition will exist at the destination at the arrival time. Responsive to determining that the condition will exist at the destination at the arrival time, a route and/or a navigation of the vehicle can be adjusted to arrive at the destination to avoid the condition.

21 Claims, 4 Drawing Sheets

200

400

ADJUSTING ARRIVAL TIME BASED ON DESTINATION CONDITIONS

FIELD

The subject matter described herein relates in general to vehicles and, more particularly, to routing and/or navigation of vehicles.

BACKGROUND

Many vehicles are equipped with a navigation system. A navigation system can aid in the navigating or routing of a vehicle from a starting point to a destination. Some navigation systems can route a vehicle to avoid traffic, tolls, or highways.

SUMMARY

In one respect, the present disclosure is directed to a method of adjusting an estimated time of arrival of a vehicle. The method can include determining an arrival time at a destination. The method can include determining whether a condition will exist at the destination at the arrival time. The method can include, responsive to determining that the condition will exist at the destination at the arrival time, adjusting a route and/or a navigation of the vehicle to arrive at the destination to avoid the condition.

In another respect, the present disclosure is directed to a system for adjusting an estimated time of arrival of a vehicle. The system can include one or more processors. The one or more processors can be programmed to initiate executable operations. The executable operations can include determining an arrival time at a destination. The executable operations can include determining whether a condition will exist at the destination at the arrival time. The executable operations can include, responsive to determining that the condition will exist at the destination at the arrival time, adjusting a route and/or a navigation of the vehicle to arrive at the destination to avoid the condition.

DETAILED DESCRIPTION

Figure 1:
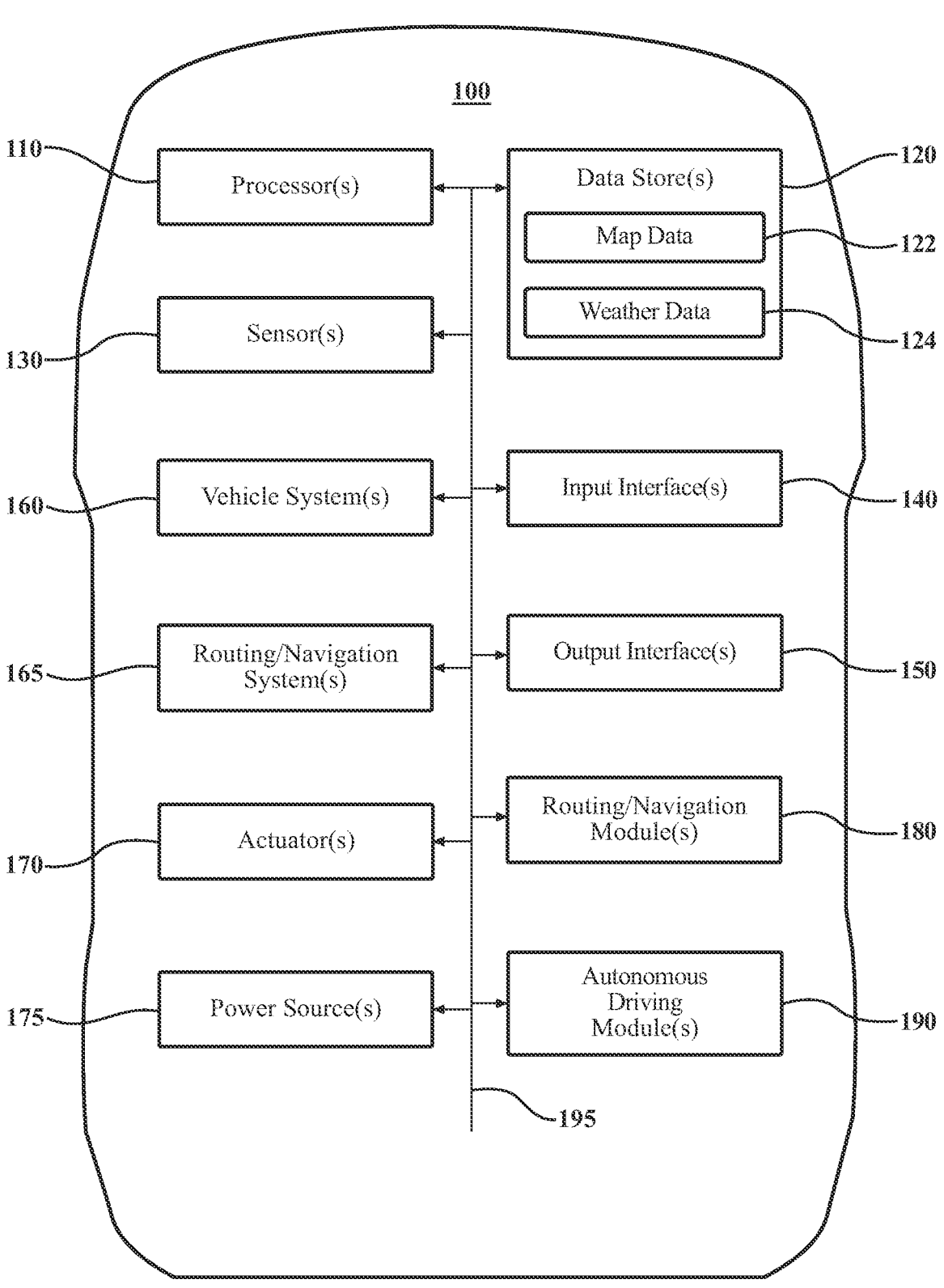
FIG. 1 is an example of a vehicle configured to adjust an estimated time of arrival of the vehicle based on a condition at a destination.

Many navigation systems will route a vehicle to a destination based on the route that represents the shortest amount of time or the most fuel efficient. Some navigation systems can allow a user to avoid certain things like toll roads and highways along the route. However, navigation systems do not route based on conditions at a destination, such as weather conditions. Thus, the navigation system will route the vehicle to the destination regardless of the weather conditions at the destination. Unfavorable weather conditions may be present at the destination; consequently, the vehicle occupants may have to walk in unfavorable weather.

At least in some instances, it may be possible to avoid an unfavorable condition at the destination, sparing the vehicle occupant(s) from being exposed to the condition. Accordingly, arrangements described herein are directed to adjusting the arrival time of a vehicle at a destination based on one or more conditions at the destination. An arrival time at the destination can be determined. It can be determined whether a condition will exist at the destination at the arrival time. Responsive to determining that the condition will exist at the destination at the arrival time, a route and/or a navigation of the vehicle can be adjusted so that the vehicle arrives at the destination at a different time to avoid the condition.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle 100 configured to adjust an estimated time of arrival of the vehicle based on conditions at a destination is shown. As used herein, "vehicle" means any form of motorized or powered transport, now known or later developed. In one or more implementations, the vehicle can be an automobile. While arrangements will be described herein with respect to automobiles, it will be understood that embodiments are not limited to automobiles. In some implementations, the vehicle may be a land-based craft, an aerocar, a watercraft, an aircraft or any other form of motorized transport, now known or later developed.

The vehicle 100 may be operated manually by a human driver, semi-autonomously by a mix of manual inputs from a human driver and autonomous inputs by one or more vehicle computers, fully autonomously by one or more vehicle computers, or any combination thereof. The vehicle 100 can be configured to switch between these different operational modes.

In one or more arrangements, the vehicle 100 can operate autonomously according to a particular defined level of autonomy. For example, the vehicle 100 can operate according to any of the Society of Automotive Engineers (SAE) SAE J3016 Levels of Driving Automation (e.g., Level 0-5). In some instances, arrangements described herein can be used in connection with SAE Level 3 or higher, SAE Level 4 or higher, or SAE Level 5. However, it will be understood that arrangements described herein are not limited in this regard.

The vehicle 100 can include various elements. Some of the possible elements of the vehicle 100 are shown in FIG.

1 and will now be described. However, it will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements may be shown and/or described as being located on or within the vehicle 100, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 110, one or more data stores 120, one or more sensors 130, one or more input interfaces 140, one or more output interfaces 150, one or more vehicle systems 160, one or more routing/navigation systems 165, one or more actuators 170, one or more power sources 175, and/or one or more modules (e.g., one or more routing/navigation modules 180 and/or autonomous driving module(s) 190). Each of these elements will be described in turn below.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The vehicle 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The data store(s) 120 can store any suitable data or information in any form, now known or later developed. For instance, the data store(s) 120 can store information about any of the elements of the vehicle 100.

The data store(s) 120 can include map data 122. The map data 122 can include maps of one or more geographic areas. In some instances, the map data 122 can include information or data on roads, traffic control devices, road markings, streetlights, structures, features, and/or landmarks in the one or more geographic areas. The map data 122 can include measurements, dimensions, distances, positions, coordinates, and/or information for one or more items included in the map data 122 and/or relative to other items included in the map data 122. For instance, the map data 122 can include the dimensions of individual travel lanes of a road. As an example, the map data 122 can include the width of a travel lane and/or the centerline of the travel lane. The map data 122 can include a digital map with information about road geometry. In one or more arrangements, the map data 122 can include information about the ground, terrain, roads, surfaces, and/or other features of one or more geographic areas. The map data 122 can include elevation data in the one or more geographic areas. The map data 122 can define one or more ground surfaces, which can include paved roads, unpaved roads, land, and other things that define a ground surface. The map data 122 can include lane markings and associated dimensions. The map data 122 can be high quality and/or highly detailed. The map data 122 can include information about parking at various places. Such information can include the existence of parking spaces, the type of parking spaces (e.g., covered or uncovered, street or parking structure, above ground, below ground, ground level, etc.), the availability of parking spaces, the unavailability of parking spaces, etc.

The data store(s) 120 can include weather data 124. The weather data 124 can include current weather data received from one or more sources. The weather data 124 can include historical weather data for a given area over any period of time. The weather data 124 can include predictions and determinations of weather at a given place.

The vehicle 100 can include one or more sensors 130. "Sensor" means any device, component and/or system that can detect, determine, assess, monitor, measure, quantify and/or sense something. The one or more sensors 130 can detect, determine, assess, monitor, measure, quantify and/or sense in real-time. As used herein, the term "real-time" means a level of processing responsiveness that a user, entity, component, and/or system senses as sufficiently immediate for a particular process or determination to be made, or that enables a processor to process data at substantially the same rate as some external process or faster.

In arrangements in which there are a plurality of sensors 130, the sensors 130 can work independently from each other. Alternatively, two or more of the sensors 130 can work in combination with each other. In such case, the two or more sensors 130 can form a sensor network. The sensor(s) 130 can be operatively connected to the processor(s) 110, the data store(s) 120, and/or other element of the vehicle 100 (including any of the elements shown in FIG. 1). The sensor(s) 130 can acquire data of at least a portion of the vehicle 100.

In some arrangements, the sensor(s) 130 can include one or more vehicle sensors. The vehicle sensor(s) can detect, determine, assess, monitor, measure, quantify and/or sense information about the vehicle 100 itself. Examples of such data can include position, orientation, speed, acceleration, deceleration, settings, performance of the vehicle systems 160 or components thereof, etc.

The sensor(s) 130 can include one or more environment sensors. The environment sensor(s) can be any type of sensor, now known or later developed, configured to detect, determine, assess, monitor, measure, quantify, acquire, and/or sense driving environment data. "Driving environment data" includes any data or information about the external environment in which a vehicle is located or one or more portions thereof. In one or more arrangements, the environment sensors can include one or more cameras, one or more radar sensors, one or more lidar sensors, one or more sonar sensors, one or more ranging sensors, and/or one or more other sensors.

The vehicle 100 can include one or more input interfaces 140. An "input interface" includes any device, component, system, element or arrangement or groups thereof that enable information/data to be entered into a machine. The input interface(s) 140 can receive an input from a user (e.g., a person) or other entity. Any suitable input interface(s) 140 can be used, including, for example, a keypad, display, touch screen, multi-touch screen, button, joystick, mouse, track-ball, microphone, gesture recognition (radar, lidar, camera, or ultrasound-based), and/or combinations thereof.

The vehicle 100 can include one or more output interfaces 150. An "output interface" includes any device, component, system, element, or arrangement or groups thereof that enable information/data to be presented to a user (e.g., a person) or other entity. The output interface(s) 150 can present information/data to a user or other entity. The output interface(s) 150 can include a display, an earphone, a haptic device, and/or a speaker. Some components may serve as both a component of the input interface(s) 140 and a component of the output interface(s) 150.

The vehicle 100 can include one or more vehicle systems 160. The vehicle system(s) 160 can include a propulsion system, a braking system, a steering system, a throttle system, a transmission system, a signaling system, and/or the routing/navigation system(s) 165. Each of these systems can include one or more mechanisms, devices, elements, components, systems, and/or combinations thereof, now known or later developed. The above examples of the vehicle systems 160 are non-limiting. Indeed, it will be understood that the vehicle systems 160 can include more, fewer, or different vehicle systems. It should be appreciated that although particular vehicle systems are separately defined, each or any of the systems or portions thereof may be otherwise combined or segregated via hardware and/or software within the vehicle.

The routing/navigation system(s) 165 can include one or more mechanisms, devices, elements, components, systems, applications and/or combinations thereof, now known or later developed, configured to determine the geographic location of the vehicle and/or to determine a travel route for the vehicle. The routing/navigation system(s) 165 can include one or more mapping applications to determine a travel route for the vehicle 100 from a starting position to a destination.

In one or more arrangements, the routing/navigation system(s) 165 can include a global positioning system, a local positioning system, and/or a geolocation system. The routing/navigation system(s) 165 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the routing/navigation system(s) 165 can use Transmission Control Protocol (TCP) and/or a Geographic information system (GIS) and location services.

The routing/navigation system(s) 165 may include a transceiver configured to estimate a position of the vehicle 100 with respect to the Earth. For example, the routing/navigation system(s) 165 can include a GPS transceiver to determine the vehicle's latitude, longitude and/or altitude. The routing/navigation system(s) 165 can use other systems (e.g., laser-based localization systems, inertial-aided GPS, and/or camera-based localization) to determine the location of the vehicle 100.

The vehicle 100 can include one or more actuators 170. The actuator(s) 170 can be used at various locations in the vehicle. The actuator(s) 170 can modify, adjust and/or alter one or more of the vehicle systems 160 or components thereof. The actuator(s) 170 can perform such actions responsive to receiving signals or other inputs from the processor(s) 110, module(s), and/or other element(s) of the vehicle 100. The actuator(s) can include motors, pneumatic actuators, hydraulic pistons, relays, solenoids, and/or piezo-electric actuators, just to name a few possibilities.

As noted above, the vehicle 100 can include one or more power sources 175. The power source(s) 175 can be any power source capable of and/or configured to energize the actuators 170 or other component(s) of the vehicle 100. For example, the power source(s) 175 can include one or more batteries, one or more fuel cells, one or more generators, one or more alternators, one or more solar cells, and combinations thereof.

The vehicle 100 can include one or more modules. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data stores 120 may contain such instructions. The modules described herein can include artificial or computational intelligence elements, e.g., neural network, fuzzy logic or other machine learning algorithms. Further, the modules can be distributed among a plurality of modules.

The vehicle 100 can include one or more routing/navigation modules 180. The routing/navigation module(s) 180 can be configured to determine a route for the vehicle 100. The routing/navigation module(s) 180 can be configured to work in connection with the routing/navigation system(s) 165. In some arrangements, the routing/navigation module(s) 180 can be a part of the routing/navigation system(s) 165 or vice versa. The routing/navigation module(s) 180 can be configured to determine an estimated time of arrival from a starting point (e.g., a current location of the vehicle 100) to a destination. The determination can take into account distance, speed limits, traffic conditions, weather along the route, or any other suitable factor in any suitable manner, now known or later developed.

The routing/navigation module(s) 180 can be configured to determine whether a condition will exist at the destination at the arrival time. The condition can be a condition that would be unfavorable for a person arriving at the destination or when exiting the vehicle 100 at the destination. This determination can be updated dynamically. The determination can be performed continuously, periodically, irregularly, randomly, responsive to some condition or event, or responsive to a user command. The determination can include acquiring information or data from one or more external or remote sources.

The condition can be bad weather, an event, parking unavailability, type of parking, and/or time of day, just to name a few possibilities. "Bad weather" can be any weather condition that would be unfavorable for a person to be exposed to when exiting the vehicle 100. Non-limiting examples of "bad weather" include snow, strong winds, fog, rain (light, normal, heavy, torrential), mist, hail, sleet, tornadoes, and hurricanes, just to name a few possibilities. An "event" is any gathering of people, such as a sporting event, a performing arts event, or a festival, just to name a few possibilities. "Type of parking" refers to covered or uncovered parking. "Parking unavailability" refers to a low availability of parking spaces in an area (e.g., about 20% or less, about 15% or less, about 10% or less, about 5% or less, about 4% or less, about 3% or less, about 2% or less, or about 1% or less). "Time of day" refers to daytime and nighttime.

In the case of bad weather, the routing/navigation module(s) 180 can be configured to receive weather information or data from one or more sources. The routing/navigation module(s) 180 can be configured to forecast or predict the weather for the destination at the estimated time of arrival. Alternatively, the routing/navigation module(s) 180 can be configured to receive a weather forecast for the destination at the estimated time of arrival.

In the case of an event, the routing/navigation module(s) 180 can be configured to receive information about an event occurring at or near the destination at the estimated time of arrival. For instance, the routing/navigation module(s) 180 can receive information on a sporting event occurring at or near the destination. In some instances, the information can include when the sporting event will end, which can provide some indication as to conditions at the destination. In some arrangements, the routing/navigation module(s) 180 can determine the nature of an event based on a calendar invitation or entry. For instance, the entry may indicate that the event is at an outdoor park or within a building.

Regarding the type of parking and parking unavailability, the routing/navigation module(s) 180 can be configured to receive information about parking at or near (e.g., within a radius of the destination) the destination. The routing/navigation module(s) 180 can be configured to receive information about the type and/or availability/unavailability of parking from any suitable source. The information can include whether the parking is covered or uncovered. The information can include current parking status and/or forecasted parking status. In some instances, the type of parking can be identified by the map data 122. The routing/navigation module(s) 180 can be configured to receive information about parking inventory at or near a destination.

In the case of time of day, the routing/navigation module(s) 180 can be configured to receive time of day information or data from one or more sources, such as a remote source or from the data store(s) 120. For instance, the routing/navigation module(s) 180 can be configured to receive information about sunrise, sunset, daylight hours, and/or nighttime hours, just to name a few possibilities.

Responsive to determining that the condition will exist at the destination at the arrival time, the routing/navigation module(s) 180 can be configured to adjust the routing and/or the navigation of the vehicle to arrive at the destination at a different time to avoid the condition. It will be appreciated that, at least in some instances, there can be a temporal component to avoiding the condition, as a vehicle occupant may not want to wait too long for the condition to cease. Thus, the routing/navigation module(s) 180 can be configured to adjust the routing and/or the navigation of the vehicle to arrive at the destination within the near future of the arrival time. "Within the near future of the arrival time" can include a period of time before or after the arrival time. In some arrangements, this period of time can be predetermined, such as by a vehicle manufacturer or some other entity. In some arrangements, the period of time can be user configurable. In some arrangements, "within the near future of the arrival time" can be defined by an amount of time beyond the original estimated time of arrival (e.g., 5 minutes, 10 minutes, 15 minutes, 20 minutes, 25 minutes, 30 minutes, etc.). In some arrangements, this amount of time can be applied in instances in which the trip exceeds a threshold amount of time (e.g., 1 hour). In some arrangements, "within the near future of the arrival time" can be defined by a percentage of the original estimated travel time (e.g., 5%, 10%, 15%, etc.).

In some arrangements, the routing/navigation module(s) 180 can be configured to adjust the routing and/or the navigation of the vehicle to arrive at the destination within the near future after the arrival time. Such adjusting can include selecting a slower route, selecting a slower travel lane along a current route, and/or traveling at a speed below the speed limit.

In some arrangements, the routing/navigation module(s) 180 can be configured to adjust the routing and/or the navigation of the vehicle to arrive at the destination before the arrival time. For example, the routing/navigation module(s) 180 can be configured to identify and select a faster route. As another example, the routing/navigation module(s) 180 can be configured to adjust the routing and/or the navigation of the vehicle to arrive at the destination before the arrival time within safe limits. "Within safe limits" can include aggressive driving. Aggressive driving can include driving maneuvers or routes that safely violate a traffic rule. Examples of violating a traffic rule include driving at least partially on a shoulder of a road, exceeding the speed limit, driving at least partially on an emergency lane, passing in a non-passing travel lane, and/or driving at least partially off the road, just to name a few possibilities. "Safely violate a traffic rule" means that the operation of the vehicle would violate a traffic rule, but it would not result in damage, injury, or endangerment of the vehicle 100, its occupants, or persons or property located in the external environment (e.g., by collision). If at least a portion of a maneuver or route would violate a traffic rule but would also result in an object in the external environment being struck by the vehicle, then the maneuver or route would not be considered to safely violate a traffic rule.

In some instances, the routing/navigation module(s) 180 can determine that the condition will still exist within the near future of the arrival time. In some arrangements, the routing/navigation module(s) 180 can also determine that the condition will still exist even if the vehicle 100 arrives at the destination before the arrival time. These determinations can arise when there is a prolonged period of bad weather. In such cases, the vehicle 100 can be navigated and/or routed to arrive at the destination at the originally determined arrival time.

In some instances, the routing/navigation module(s) 180 can determine that the condition will not exist at the destination at the originally determined arrival time. In such case, the vehicle 100 can be navigated and/or routed to arrive at the destination at the originally determined arrival time.

In some arrangements, the routing/navigation module(s) 180 can be configured to notify a vehicle occupant (e.g. a driver and/or other passenger) of the adjusted route and/or navigation and/or the condition that will be present at the destination at the original time of arrival. Such a notification can be provided in one or more forms by the output interface(s) 150, such as a visual notification and/or an audial notification.

In some arrangements, a vehicle occupant can be prompted to provide permission to implement the adjusted routing/navigation. The vehicle occupant can be prompted in any suitable manner. For instance, a prompt can be presented on a display within the vehicle 100. Alternatively or in addition, the prompt can be audibly output to the driver or other passenger over one or more audial channels. Other forms of prompting can be used as an alternative or in addition to the above-described forms of prompting. In response to receiving an input corresponding to a vehicle occupant's approval to implement the adjusted route and/or navigation, the vehicle 100 can be caused to implement the adjusted route and/or navigation. In some instances, such as when the vehicle is being operated by a human driver (e.g., SAE Levels 0-2), the adjusted route and/or navigation can be presented to the driver, and it can be up to the driver to decide whether or not to implement the adjusted route and/or navigation.

When the vehicle 100 is an autonomous vehicle or is configured to operate in one or more autonomous operational modes (e.g., SAE Level 3 or higher), the vehicle 100 can include one or more autonomous driving modules 190. The autonomous driving module(s) 190 can receive data from the sensor(s) 130 (e.g., the environmental sensor(s)) and/or any other type of system capable of capturing information relating to the vehicle and/or the external environment of the vehicle 100. The autonomous driving module(s) 190 can receive, capture, and/or determine location information for obstacles within the external environment of the vehicle for use by the processor(s) 110, and/or one or more of the modules described herein to estimate position and orientation of the vehicle, vehicle position in global coordinates based on signals from a plurality of satellites, or any other data and/or signals that could be used to determine the current state of the vehicle or determine the position of the vehicle in respect to its environment for use in either creating a map or determining the position of the vehicle in respect to map data. The autonomous driving module(s) 190 can determine and/or detect the presence of obstacles, the location of obstacles, the identity of obstacles, and/or other environmental features including traffic signs, trees, shrubs, neighboring vehicles, pedestrians, etc.

The autonomous driving module(s) 190 can determine travel path(s), current autonomous driving maneuvers for the vehicle, future autonomous driving maneuvers and/or modifications to current autonomous driving maneuvers based on data acquired by the sensor(s) 130, driving scene models, and/or data from any other suitable source. "Driving maneuver" means one or more actions that affect the movement of a vehicle. Examples of driving maneuvers can include accelerating, decelerating, braking, turning, moving in a lateral direction of the vehicle, changing travel lanes, merging into a travel lane, and/or reversing, just to name a few possibilities. The autonomous driving module(s) 190 can cause, directly or indirectly, such autonomous driving maneuvers to be implemented. The autonomous driving module(s) 190 can execute various vehicle functions and/or can transmit data to, receive data from, interact with, and/or control the vehicle or one or more systems thereof (e.g. one or more of vehicle systems 160).

The processor(s) 110 and/or the autonomous driving module(s) 190 can be operatively connected to communicate with the various vehicle systems 160 and/or individual components thereof. For example, the processor(s) 110 and/or the autonomous driving module(s) 190 can be in communication to send and/or receive information from the various vehicle systems 160 to control the movement, speed, maneuvering, heading, direction, etc. of the vehicle. The processor(s) 110 and/or the autonomous driving module(s) 190 may control some or all of these vehicle systems 160 and, thus, may be partially or fully autonomous.

For instance, when operating in an autonomous mode, the processor(s) 110 and/or the autonomous driving module(s) 190 can control the direction and/or speed of the vehicle 100. The processor(s) 110 and/or the autonomous driving module(s) 190 can cause the vehicle to accelerate (e.g., by increasing the supply of fuel provided to the engine), decelerate (e.g., by decreasing the supply of fuel to the engine and/or by applying brakes) and/or change direction (e.g., by turning the front two wheels).

The various elements of the vehicle 100 can be communicatively linked to one another or one or more other elements through one or more communication networks 195. As used herein, the term "communicatively linked" can include direct or indirect connections through a communication channel, bus, pathway or another component or system. A "communication network" means one or more components designed to transmit and/or receive information from one source to another. The data store(s) 120 and/or one or more other elements of the vehicle 100 can include and/or execute suitable communication software, which enables the various elements to communicate with each other through the communication network and perform the functions disclosed herein.

The one or more communication networks 195 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network(s) 195 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 2:
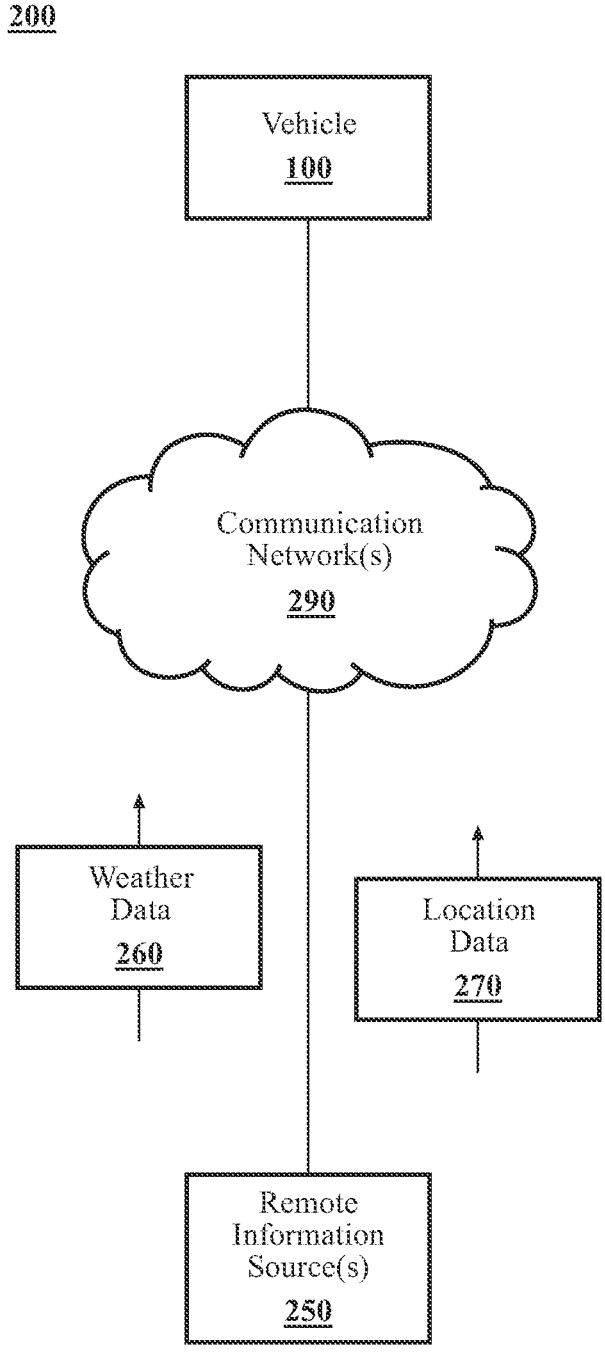
FIG. 2 is an example of a system for adjusting an estimated time of arrival of the vehicle based on a condition at a destination.

FIG. 2 is an example of a system 200 for adjusting an estimated time of arrival of the vehicle based on conditions at a destination. The vehicle 100 (or one or more components thereof) can be operatively connected to other items, devices, sources, or entities that can facilitate the determination of whether a condition will exist at the destination at the arrival time. For example, the vehicle 100 (or one or more components thereof) can be operatively connected to one or more remote information sources 250.

The remote information source(s) 250 can be any suitable source of information that can be used by the vehicle 100 in arrangements described herein. The vehicle 100 or any element of the vehicle 100 can be configured to obtain information from the remote information source(s) 250, such as by a communication system. The remote information source(s) 250 can include third party sources.

The remote information source(s) 250 can include weather data. For instance, the remote information source(s) 250 can include a weather database, a weather news source, an online weather database, a weather-related website, the radio, television, or other suitable source. Such data can include present, past and/or future weather data. Future weather data includes forecasted conditions based on one or more factors. The weather data can include real-time weather conditions and/or road conditions (e.g. wet roads, snow on the roads, etc.) in a particular area. The vehicle 100 can acquire weather data 260 from the remote information source(s) 250.

The remote information source(s) 250 can include location data 270. The location data 270 can be any information about a destination or an area near the destination. The location data 270 can include information about parking at various places (e.g., the destination). Such information can include the existence of parking spaces, the type of parking spaces (e.g., covered or uncovered, street or parking structure, etc.), the availability of parking spaces, etc. The location data 270 can include information about events occurring at or near the destination.

The remote information source(s) 250 can include traffic data. For instance, the remote information source(s) 250 can include a traffic database, a traffic news source, an online traffic database, a traffic-related website, the radio, television, or other suitable source. Such data can include present, past and/or future traffic data. Future traffic data includes predicted conditions based on one or more factors. The traffic data can include real-time traffic conditions and/or road conditions in a particular area, on a particular road, on a route, etc.

The vehicle 100 and the remote information source(s) 250 can be communicatively linked through one or more communication networks 290. The discussion of "communicatively linked" and "communication network" above in connection with FIG. 1 applies equally here. The vehicle 100 and the remote information source(s) 250 can include and/or can execute suitable communication software, which enables two or more of the elements to communicate with each other through the communication network(s) 290 and perform the functions disclosed herein.

Now that the various potential systems, devices, elements and/or components have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 3:
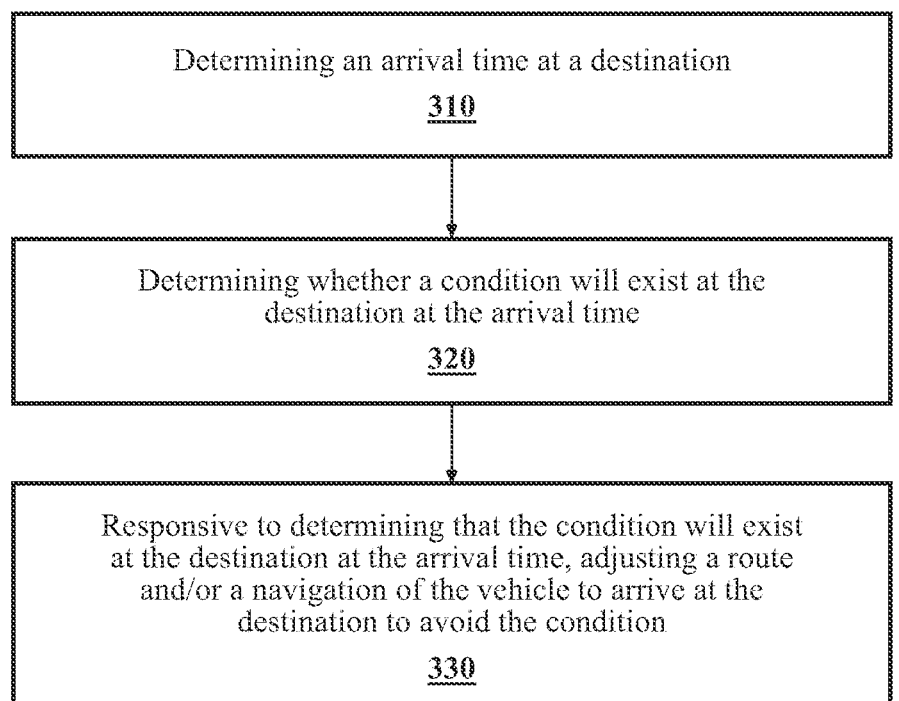
FIG. 3 is an example of a method of adjusting an estimated time of arrival of the vehicle based on a condition at a destination.

Turning to FIG. 3, an example of a method 300 of adjusting an estimated time of arrival of the vehicle based on conditions at a destination. At block 310, an arrival time at a destination can be determined. Such a determination can be performed by the routing/navigation module(s) 180, the routing/navigation system(s) 165, the processor(s) 110, and/or other module(s). The method 300 can continue to block 320.

At block 320, it can be determined whether a condition will exist at the destination at the arrival time. Such a determination can be performed by the routing/navigation module(s) 180, the routing/navigation system(s) 165, the processor(s) 110, and/or other module(s). Such a determination can be made using information or data stored in the data store(s) 120 and/or by using information acquired from the remote information source(s) 250. The method 300 can continue to block 330.

At block 330, responsive to determining that the condition will exist at the destination at the arrival time, the routing and/or the navigation of the vehicle can be adjusted to arrive at the destination to avoid the condition. Such adjusting can be performed by the routing/navigation module(s) 180, the autonomous driving module(s) 190, the processor(s) 110, and/or other module(s). In such case, the vehicle can be operating in an autonomous operational mode, such as SAE Level 3 or higher.

After block 330, the method 300 can end. Alternatively, the method 300 can return to block 310 or some other block. In some instances, the method 300 can end when the destination is reached.

The method 300 can be performed continuously, periodically, irregularly, randomly, or responsive to a condition, event, or input. The method 300 can include additional and/or alternative steps to those described above. For example, the method 300 can include, responsive to determining that the condition will not exist at the destination at the arrival time, navigating the vehicle to arrive at the destination at the arrival time. Such navigating can be performed by the human driver or by the autonomous driving module(s) 190.

Figure 4:
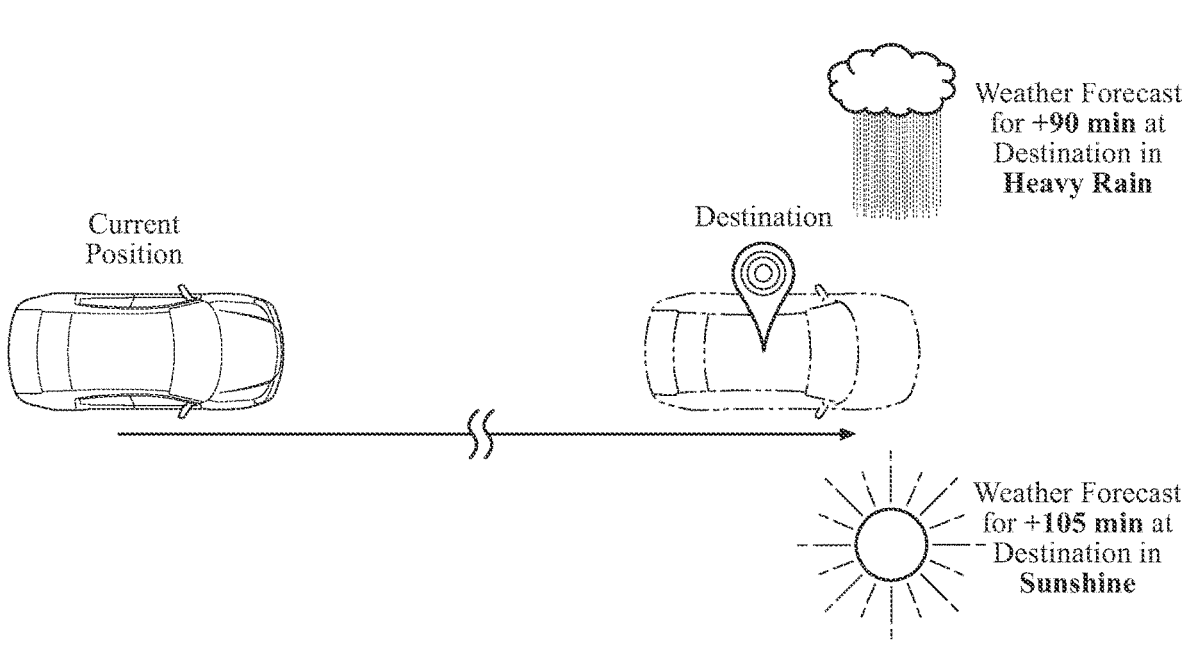
FIG. 4 is an example of a driving scenario of adjusting an estimated time of arrival of the vehicle based on a condition at a destination.

A non-limiting example of the operation of the arrangements described herein will now be presented in connection to FIG. 4. FIG. 4 is an example of a driving scenario 400. The vehicle 100 can be at a current position or starting point. A destination can be provided to the vehicle 100 or the vehicle 100 can identify the destination. At the destination, the vehicle occupant will have to walk about 10 minutes to a building from a parking lot. The vehicle 100 can be operating in an autonomous operational mode, such as SAE Level 4 (self-driving). At this level, a vehicle occupant may watch a movie or even sleep.

The vehicle 100 can determine an arrival time at the destination. The vehicle 100 can do so using standard routing and/or navigation techniques, which may also include user preferences (e.g., avoid tolls, avoid highways, shortest distance, shortest time, etc.). Here, the vehicle 100 can determine that it will take 90 minutes to reach the destination.

The vehicle 100 can coordinate with a remote data source to obtain weather data for the destination at the arrival time. In this example, the weather data can include a current weather forecast of heavy rain at the destination at the estimated time of arrival. Thus, the vehicle 100 determines that a condition (bad weather) will exist at the destination at the arrival time. However, based on the weather data, the vehicle 100 can determine that the weather forecast at the destination in 105 minutes is sunshine. Thus, the bad weather condition will no longer be present in 105 minutes. The difference of 105 minutes is considered "within the near future" of the original estimated time of arrival.

Accordingly, responsive to determining that the condition will exist at the destination at the arrival time, the vehicle 100 can automatically adjust the routing and/or the navigation of the vehicle to arrive at the destination at a different time (e.g., in 105 minutes), thereby avoiding the condition.

To do so, the vehicle can select a longer or extended route, a slower route, and/or drive at a slower speed. Thus, when the vehicle 100 arrives at the destination, the weather will be favorable, and the user will have a much nicer walk from the parking lot to the building.

In this example, the vehicle 100 has adjusted the routing and/or navigation of the vehicle 100 to arrive at the destination later than the original estimated time of arrival to avoid the condition. However, it will be appreciated that, in some circumstances, the vehicle 100 can be configured to adjust the routing and/or navigation of the vehicle 100 to arrive at the destination before the original estimated time of arrival, such as to avoid an oncoming storm. In such case, the vehicle 100 can take a route that is faster. However, there may be other sacrifices in taking the adjusted navigation and/or route, such as reduced fuel efficiency.

In another example, the condition can be the time of day. The vehicle 100 can be traveling at night. If the time of arrival is still when it would be dark outside, the vehicle 100 can adjust the navigation and/or routing of the vehicle so that it reaches the destination in the daylight.

In still another example, the condition can be a plurality of conditions. For example, the condition can be weather, type of parking, and/or event. If the time of arrival coincides with bad weather, but the parking is covered and is adjacent to an indoor event, then the vehicle 100 may stick with the originally determined time of arrival. However, if the time of arrival coincides with bad weather and the parking is not covered and/or the event is outdoors, the vehicle 100 may delay the arrival time to an arrival time that is within the near future of the original arrival time.

It will be appreciated that arrangements described herein can provide numerous benefits, including one or more of the benefits mentioned herein. For example, arrangements described herein can automatically adapt routes based on forecasted weather and/or other external conditions at a destination. Arrangements described herein can route and navigate a vehicle to arrive at a destination when one or more external conditions are favorable. Arrangements described herein can cause the vehicle to arrive at the destination within a reasonable amount of time of a standard routing. Arrangements described herein can enhance a user's experience with a vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/ units or less, within 14 degrees/percent/units or less, within 13 degrees/percent/units or less, within 12 degrees/percent/ units or less, within 11 degrees/percent/units or less, within 10 degrees/percent/units or less, within 9 degrees/percent/ units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A method of adjusting an estimated time of arrival of a vehicle carrying a passenger, the method comprising:
    determining an arrival time at a destination;
    determining whether a condition will exist at the destination at the arrival time, the condition being weather;
    responsive to determining that the condition will exist at the destination at the arrival time, adjusting a route of the vehicle to arrive at the destination at a different arrival time to avoid the condition; and
    causing the vehicle to autonomously adjust the route according to the adjusted route, whereby movement of the vehicle is changed, whereby exposure of the passenger to the condition at the destination is avoided.

2. The method of claim 1, wherein adjusting the route of the vehicle to arrive at the destination at the different arrival time to avoid condition includes adjusting the route of the vehicle to arrive at the destination within the near future after the arrival time.

3. The method of claim 2, wherein within the near future includes a predetermined period of time after the arrival time.

4. The method of claim 2, wherein adjusting the route of the vehicle to arrive at the destination within the near future after the arrival time includes selecting a slower route.

5. The method of claim 2, wherein adjusting the route of the vehicle to arrive at the destination within the near future after the arrival time includes selecting a slower travel lane.

6. The method of claim 2, wherein adjusting the route of the vehicle to arrive at the destination within the near future after the arrival time includes traveling at a speed below a speed limit.

7. The method of claim 1, wherein adjusting the route a of the vehicle to arrive at the destination at the different arrival time to avoid condition includes adjusting the route of the vehicle to arrive at the destination before the arrival time.

8. The method of claim 1, wherein determining whether a condition will exist at the destination at the arrival time is updated dynamically.

9. The method of claim 1, wherein weather includes a presence of at least one of snow, strong winds, fog, rain, mist, hail, sleet, tornadoes, and hurricanes at the destination.

10. The method of claim 1, wherein the vehicle is an autonomous vehicle operating at level 3 or higher.

11. The method of claim 1, wherein the determining whether a condition will exist at the destination at the arrival time includes obtaining information from a remote source.

12. The method of claim 1, wherein responsive to determining that the condition will not exist at the destination at the arrival time, navigating the vehicle to arrive at the destination at the arrival time.

13. A method of adjusting an estimated time of arrival of a vehicle carrying a passenger, the method comprising:
    determining an arrival time at a destination;
    determining whether a condition will exist at the destination at the arrival time, the condition being an event including one of a sporting event, a performing arts event, or a festival;

responsive to determining that the condition will exist at the destination at the arrival time, adjusting a route of the vehicle to arrive at the destination at a different arrival time to avoid the condition; and
causing the vehicle to autonomously adjust the route according to the adjusted route, whereby movement of the vehicle is changed, whereby exposure of the passenger to the condition at the destination is avoided.

14. A method of adjusting an estimated time of arrival of a vehicle carrying a passenger, the method comprising:
    determining an arrival time at a destination;
    determining whether a condition will exist at the destination at the arrival time, the condition being a type of parking and there being fewer parking spaces available than a threshold amount of about 20% or less;
    responsive to determining that the condition will exist at the destination at the arrival time, adjusting a route of the vehicle to arrive at the destination at a different arrival time to avoid the condition; and
    causing the vehicle to autonomously adjust the route according to the adjusted route, whereby movement of the vehicle is changed, whereby exposure of the passenger to the condition at the destination is avoided.

15. A system for adjusting an estimated time of arrival of a vehicle carrying a passenger, the system comprising:
    one or more processors being programmed to initiate executable operations comprising:
    determining an arrival time at a destination;
    determining whether a condition will exist at the destination at the arrival time, the condition being weather;
    responsive to determining that the condition will exist at the destination at the arrival time, adjusting a route of the vehicle to arrive at the destination at a different arrival time to avoid the condition; and
    causing the vehicle to autonomously adjust the route according to the adjusted route, whereby movement of the vehicle is changed, whereby exposure of the passenger to the condition at the destination is avoided.

16. The system of claim 15, wherein adjusting the route of the vehicle to arrive at the destination at the different arrival time to avoid condition includes adjusting the route of the vehicle to arrive at the destination within the near future after the arrival time.

17. The system of claim 16, wherein adjusting the route of the vehicle to arrive at the destination within the near future after the arrival time includes one of:
    selecting a slower route;
    selecting a slower travel lane; and
    traveling at a speed below a speed limit.

18. The system of claim 15, wherein adjusting the route of the vehicle to arrive at the destination at the different arrival time to avoid the condition includes adjusting the route of the vehicle to arrive at the destination before the arrival time.

19. The system of claim 15, wherein the weather includes a presence of at least one of snow, strong winds, fog, rain, mist, hail, sleet, tornadoes, and hurricanes at the destination.

20. The system of claim 15, wherein responsive to determining that the condition will not exist at the destination at the arrival time, navigating the vehicle to arrive at the destination at the arrival time.

21. A system for adjusting an estimated time of arrival of a vehicle carrying a passenger, the system comprising:

one or more processors being programmed to initiate executable operations comprising:

determining an arrival time at a destination;

determining whether a condition will exist at the destination at the arrival time, the condition being one of:

an event including one of a sporting event, a performing arts event, or a festival; or a type of parking and there being fewer parking spaces available than a threshold amount of about 20% or less;

responsive to determining that the condition will exist at the destination at the arrival time, adjusting a route of the vehicle to arrive at the destination at a different arrival time to avoid the condition; and causing the vehicle to autonomously adjust the route according to the adjusted route, whereby movement of the vehicle is changed, whereby exposure of the passenger to the condition at the destination is avoided.

\*　\*　\*　\*　\*